(12) United States Patent
Hopkins (10) Patent No.: US 10,413,852 B2
(45) Date of Patent: Sep. 17, 2019

(54) FILTER, FILTER DEVICE, AND METHOD OF USE

(71) Applicant: PALL CORPORATION, Port Washington, NY (US)

(72) Inventor: Scott Hopkins, Dryden, NY (US)

(73) Assignee: Pall Corporation, Port Washington, NY (US)

( * ) Notice: Subject to any disclaimer, the term of this patent is extended or adjusted under 35 U.S.C. 154(b) by 198 days.

(21) Appl. No.: 15/472,598

(22) Filed: Mar. 29, 2017

(65) Prior Publication Data

US 2018/0280848 A1 Oct. 4, 2018

(51) Int. Cl.
| | |
|---|---|
| *B01D 39/20* | (2006.01) |
| *B01D 46/00* | (2006.01) |
| *B01D 46/24* | (2006.01) |
| *B33Y 10/00* | (2015.01) |
| *B33Y 80/00* | (2015.01) |
| *B01D 29/00* | (2006.01) |
| *B01D 29/33* | (2006.01) |
| *B01D 46/30* | (2006.01) |
| *B22F 3/10* | (2006.01) |

(Continued)

(52) U.S. Cl.
CPC ..... *B01D 39/2034* (2013.01); *B01D 29/0093* (2013.01); *B01D 29/33* (2013.01); *B01D 46/0001* (2013.01); *B01D 46/0004* (2013.01); *B01D 46/2411* (2013.01); *B01D 46/2414* (2013.01); *B01D 46/30* (2013.01); *B22F 3/1017* (2013.01); *B22F 5/10* (2013.01); *B29C 64/165* (2017.08); *B33Y 10/00* (2014.12); *B33Y 80/00* (2014.12); *B01D 2101/005* (2013.01); *B01D 2201/303* (2013.01); *B01D 2201/304* (2013.01); *B01D 2271/022* (2013.01); *B22F 2301/35* (2013.01); *B22F 2998/10* (2013.01); *B29K 2505/00* (2013.01); *B29L 2031/14* (2013.01)

(58) Field of Classification Search
CPC ............ B01D 46/0005; B01D 46/0024; B01D 46/2411; B01D 46/521; B01D 2265/04; B01D 2265/06; Y10S 210/17
USPC ......... 55/502, 498, 499, 500, 501, 503, 521, 55/529, 482, 459.1, 337; 210/282, 459, 210/493, 494, 510, 497.01, 499, DIG. 17, 210/455, 496
See application file for complete search history.

(56) References Cited

U.S. PATENT DOCUMENTS 4,014,796 A * 3/1977 Sugiyama ............. B01D 29/111
 210/437
4,072,616 A * 2/1978 Rohlig ................. B01D 29/333
 210/493.5

(Continued)

FOREIGN PATENT DOCUMENTS

| CA | 2 278 961 A1 | 1/2001 |
| CN | 105 041 529 A | 11/2015 |

(Continued)

OTHER PUBLICATIONS

Element Data Sheet E12c; "PSS® Series Filter Elements", *Pall Corporation*, pp. 1-2, (2008).

(Continued)

*Primary Examiner* — Minh Chau T Pham
(74) *Attorney, Agent, or Firm* — Leydig Voit & Mayer (57) ABSTRACT

Filters, filter devices including the filters, and methods of using the filters and filter devices, are disclosed.

20 Claims, 9 Drawing Sheets

(51) Int. Cl.
*B22F 5/10* (2006.01)
*B29C 64/165* (2017.01)
*B29K 505/00* (2006.01)
*B29L 31/14* (2006.01)

(56) References Cited

U.S. PATENT DOCUMENTS

| | | | |
|---|---|---|---|
| 4,105,561 A | 8/1978 | Domnick | |
| 4,828,930 A | 5/1989 | Koehler | |
| 5,204,055 A | 4/1993 | Sachs et al. | |
| 5,736,045 A * | 4/1998 | Bies | B01D 29/111 210/497.01 |
| 6,132,483 A * | 10/2000 | Andrews | B01D 46/10 210/445 |
| 6,227,396 B1 * | 5/2001 | Small | B65D 88/022 220/4.12 |
| 7,361,300 B2 | 4/2008 | Kelly et al. | |
| 7,413,588 B2 * | 8/2008 | Holzmann | B01D 46/0005 210/282 |
| 2006/0065587 A1 * | 3/2006 | Shigesada | B01D 61/18 210/321.87 |
| 2008/0296217 A1 * | 12/2008 | Thoraval | B01D 63/066 210/484 |
| 2010/0050580 A1 | 3/2010 | Fielding | |
| 2010/0288691 A1 * | 11/2010 | Shigesada | B01D 69/10 210/455 |
| 2012/0055124 A1 * | 3/2012 | Linhart | B01D 46/02 55/341.7 |
| 2013/0239528 A1 * | 9/2013 | Coulonvaux | B01D 46/0005 55/482 |
| 2016/0121271 A1 | 5/2016 | Lescoche et al. | |
| 2016/0297097 A1 | 10/2016 | Riman | |

FOREIGN PATENT DOCUMENTS

| | | |
|---|---|---|
| JP | H05-222920 A | 8/1993 |
| JP | 2003-334431 A1 | 11/2003 |
| JP | 2004-330133 A | 11/2004 |

OTHER PUBLICATIONS

European Patent Office, Extended European Search Report in counterpart European Application No. 18163030.2, dated Aug. 6, 2018.

Japanese Patent Office, Notice of Reasons for Rejection in counterpart Japanese Application No. 2018-050875, dated Mar. 19, 2019.

Singaporean Patent Office, Written Opinion in counterpart Singaporean Application No. 10201802241P, dated Oct. 26, 2018.

* cited by examiner

FILTER, FILTER DEVICE, AND METHOD OF USE

BACKGROUND OF THE INVENTION

A variety of filters are available to filter fluids. However, some filters are inefficient and/or labor intensive/time intensive to make.

The present invention provides for ameliorating at least some of the disadvantages of the prior art. These and other advantages of the present invention will be apparent from the description as set forth below.

BRIEF SUMMARY OF THE INVENTION

An embodiment of the invention provides a filter comprising (a) a porous filter element comprising a cylindrical porous metal medium having a hollow interior, a first end, and a second end, the porous metal medium having an inner surface defining the hollow interior of the porous metal medium; (b) a first porous metal end cap at the first end of the porous metal medium, the first porous metal end cap having an inner surface facing the first end of the porous metal medium; (c) a second porous metal end cap at the second end of the porous metal medium, the second porous metal end cap having an inner surface facing the second end of the porous metal medium; wherein the inner surface of the first porous metal end cap and/or the inner surface of the second porous metal end cap includes a plurality of porous ribs extending from the inner surface toward the hollow interior; and/or the inner surface of the porous metal medium includes a least one porous rib extending from the inner surface toward the hollow interior.

In other embodiments, filter devices comprising embodiments of the filter disposed in a housing, and methods of filtering fluids using the filter and filter devices, are provided.

BRIEF DESCRIPTION OF THE SEVERAL VIEWS OF THE DRAWING(S)

FIGS. 4-7 show longitudinal cross-sectional views of other embodiments of filters according to the invention, wherein the inner surface of the porous medium includes porous ribs.

DETAILED DESCRIPTION OF THE INVENTION

In accordance with an embodiment of the present invention, a filter is provided comprising (a) a porous filter element comprising a cylindrical porous metal medium having a hollow interior, a first end, and a second end, the porous metal medium having an inner surface defining the hollow interior of the porous metal medium; (b) a first porous metal end cap formed at the first end of the porous metal medium, the first porous metal end cap having an inner surface facing the first end of the porous metal medium; (c) a second porous metal end cap formed at the second end of the porous metal medium, the second porous metal end cap having an inner surface facing the second end of the porous metal medium; wherein the inner surface of the first porous metal end cap and/or the inner surface of the second porous metal end cap includes a plurality of porous ribs extending from the inner surface toward the hollow interior; and/or the inner surface of the porous metal medium includes at least one porous rib extending from the inner surface toward the hollow interior.

In an embodiment of the filter, the porous ribs on the inner surface of the first porous metal end cap and/or on the inner surface of the second porous metal end cap are radially arranged.

In another embodiment of the filter, the at least one porous rib on the inner surface of the porous metal medium is circumferentially or helically arranged along the inner surface of the porous metal medium.

In some embodiments of the filter, the inner surface of the porous metal medium includes a plurality of porous ribs extending from the inner surface toward the hollow interior, and the porous ribs on the inner surface of the porous metal medium are axially, coaxially, circumferentially, helically and/or longitudinally arranged along the inner surface of the porous metal medium.

In some embodiments of the filter, the porous ribs extend from a portion of the inner surface of the first porous metal end cap and/or from a portion of the inner surface of the second porous metal end cap to a portion of the inner surface of the porous metal medium.

In some embodiments of the filter, the first porous metal end cap and/or the second porous metal end cap has a central opening, passing from an outer surface of the porous metal end cap through the inner surface of the porous metal end cap and communicating with the hollow interior of the porous metal medium.

Embodiments of the filter have a substantially uniform voids volume throughout the porous metal medium and the first and second end caps.

In other embodiments, filter devices comprising embodiments of the filter disposed in a housing, and methods of filtering fluids using the filter and filter devices, are provided.

In accordance with an embodiment of the invention, a filter device comprises a housing comprising an inlet and an outlet and defining a fluid flow path between the inlet and the outlet, wherein the filter is across the fluid flow path.

Embodiments of methods according to the invention comprise filtering a fluid, the method comprising passing the fluid through an embodiment of the filter or the filter device. In one embodiment of the method, the method comprises passing a fluid comprising steam and/or condensate through the filter or the filter device.

The filters and filter devices according the invention advantageously provide a combination of high filtration efficiency and low flow resistance, and are useful in a wide range of liquid, and gas (including air) filtration applications, including prefiltration for sterile filtration. Filters and filter devices according to embodiments of the invention can be used in a variety of applications and for filtering a variety of fluids, including, for example, filtering fluids for the pharmaceutical industry, filtering fluids for medical applications (including for home and/or for patient use, e.g., intravenous applications, filtering fluids for the electronics industry (e.g., filtering photoresist fluids in the microelectronics industry), filtering industrial gases (e.g., cryogenic and high temperature) steam, solvent, heat transfer fluids, and filtering fluids for the food and beverage industry. In one preferred embodiment, the filters and filter devices filter steam and/or condensate, e.g., to remove any one or more of the following from the fluid during filtration: debris, particulates and scale. The filters and filter devices have high chemical stability and do not impart taste, odor, or extractables to the effluent.

The filters and filter devices provide high throughput, and uniform flow. They have substantially uniform void volume without densified areas. They can be produced economically.

Each of the components of the invention will now be described in more detail below, wherein like components have like reference numbers.

In the illustrated embodiment shown in FIGS. 1-7, a filter 500 comprises a porous filter element 100 comprising a cylindrical porous metal medium 50 having a hollow interior 55, a first end 51, and a second end 52, wherein a first porous metal end cap 101 is formed at the first end of the metal medium, and a second porous metal end cap 102 is formed at the second end of the metal medium. In the embodiment as particularly shown in FIGS. 2 and 3, the porous metal medium has an exterior surface 50a as well as an interior surface 50b defining the hollow interior of the medium. The end caps have outer and inner surfaces 151a, 151b; 152a, 152b, wherein the respective inner surfaces face the respective ends of the metal medium. In this illustrated embodiment, the first porous metal end cap 101 and the second porous metal end cap 102 each have a central opening 151c, 152c, passing from the outer surface 151a, 152a of the end cap through the inner surface 151b, 152b of the end cap and communicating with the hollow cylindrical interior of the metal medium. In another embodiment (not shown), one of the porous metal end caps is closed (lacking an opening).

The porous metal medium 50 as well as the porous metal end caps 101,102 each allow fluid to pass therethrough, and function in filtration.

Figure 2A:
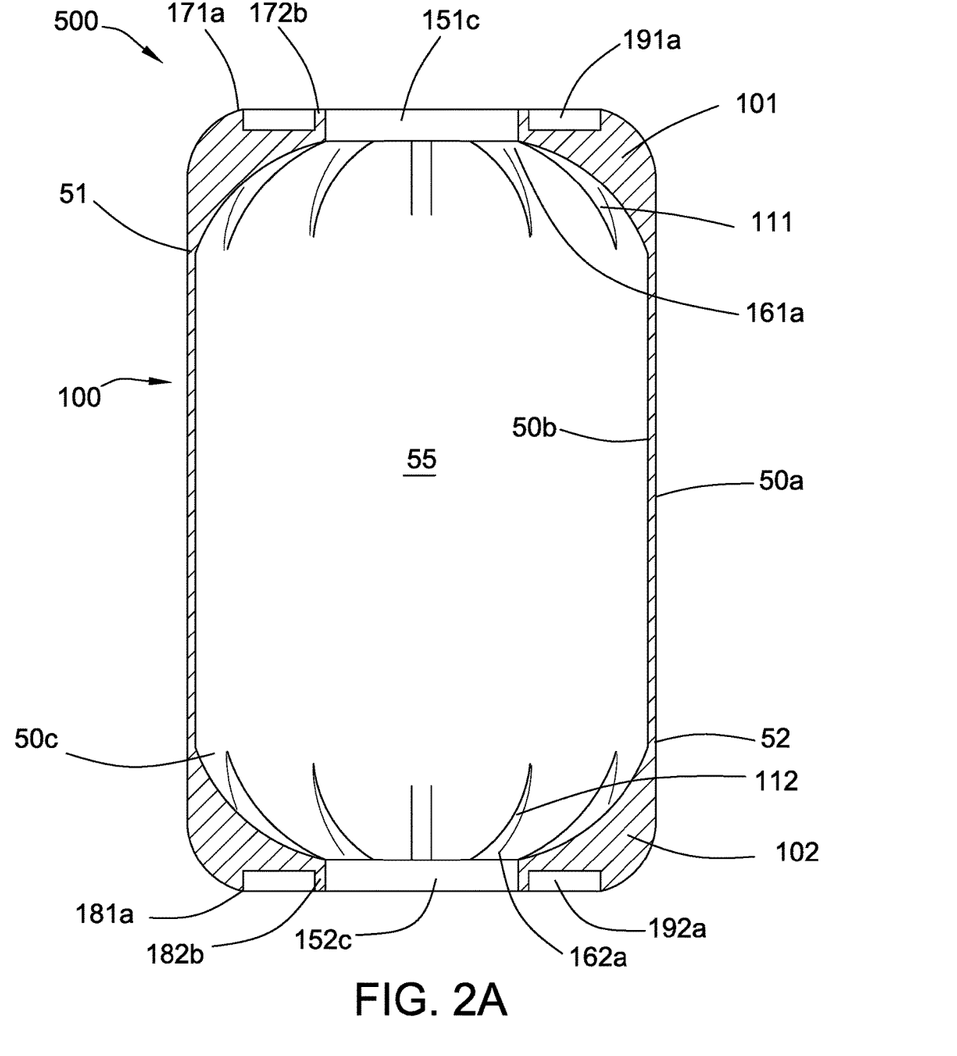
FIG. 2A is a cross-sectional view of the filter shown in FIG. 1.
Figure 2B:
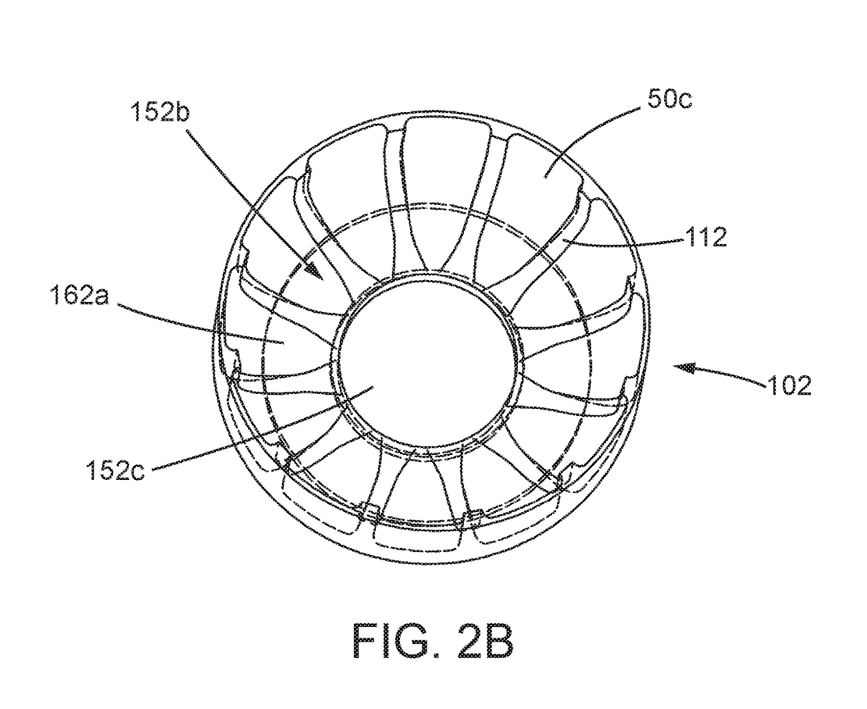
FIG. 2B is a top view of the inner surface of the end cap shown in FIG. 1.
Figure 3:
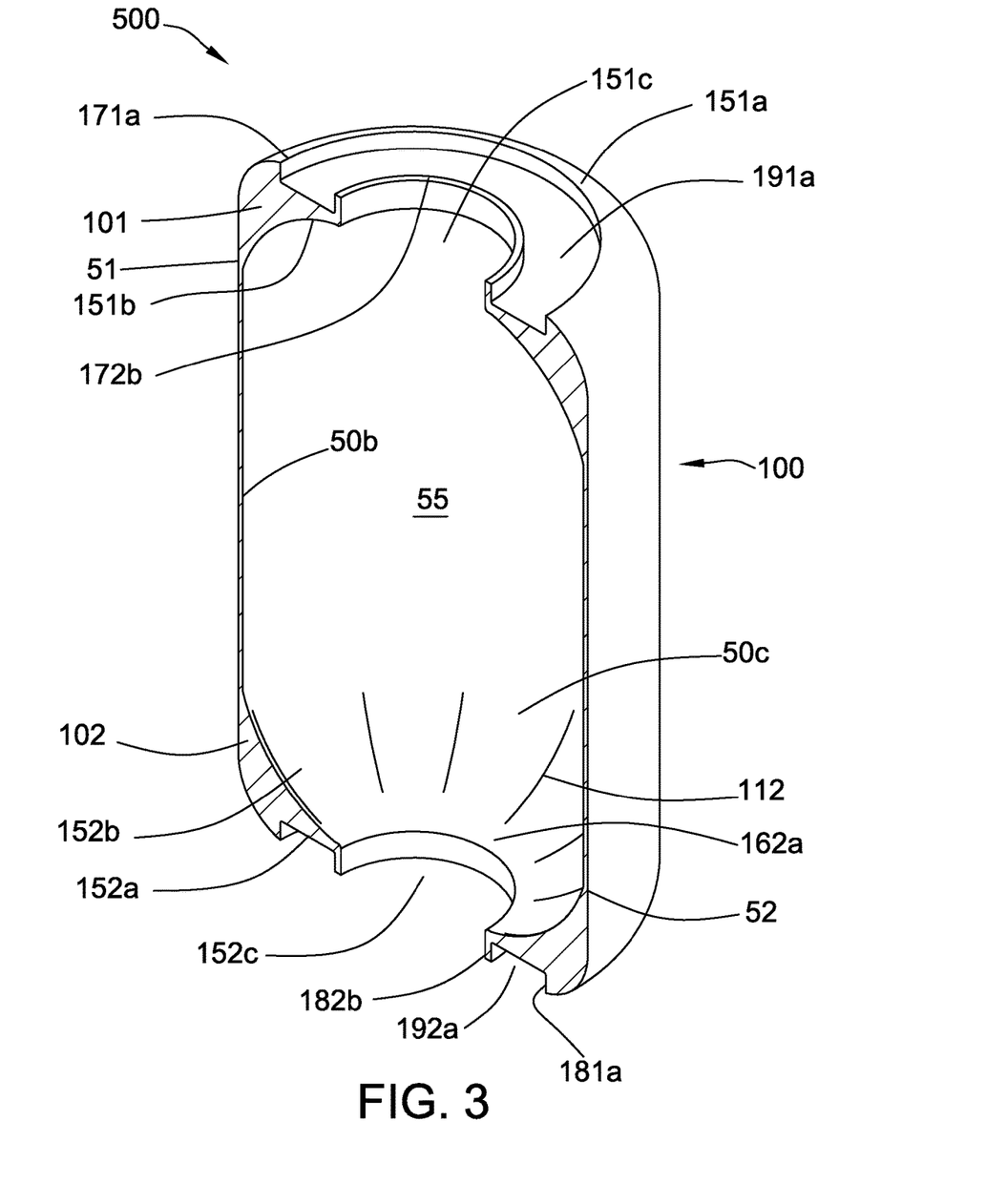
FIG. 3 is a top perspective view of a cross-sectional view of the filter shown in FIG. 1.

In the illustrated embodiments, and as particularly illustrated in FIGS. 2A 2B, and 3 (for ease of reference, the reference numbers in FIG. 2B will refer to components in the second porous metal end cap 102, but the description is equally applicable to the first porous metal end cap 101), the inner surface 151b, 152b of an end cap 101, 102 includes a plurality of porous ribs 111, 112, extending upwardly from the inner surface and facing the hollow interior of the porous medium. For example, the ribs can be axially, coaxially, radially and/or concentrically arranged along the inner surface. In the illustrated embodiment, the ribs 111, 112 are shown as radially arranged porous ribs, extending upwardly from the inner surface, wherein the ribs are preferably equally spaced from one another. The end cap can include any number of ribs, typically, at least 3 ribs. In the illustrated embodiments, the end cap has 12 ribs. The ribs can be of any suitable height (extending upwardly from the inner surface of the end cap), length, and width. In this illustrated embodiment, the ribs on a planar or somewhat planar portion 161a, 162a of the inner surface of the end cap follow an incline to reach to at least a portion 50c of the interior surface of the porous medium, e.g., the ribs are curved to continuously follow the inner surface of the end cap to the portion of the inner surface of the porous medium, e.g., so that the ribs are also longitudinally arranged on the inner surface of the porous medium. While the ribs are illustrated as substantially identical to one another, combinations of different ribs can be used, e.g., longer ribs can be alternated with shorter ribs and/or wider ribs can be alternated with narrower ribs.

Alternatively, or additionally, in some embodiments, the inner surface of the porous medium includes one or more porous ribs, extending inwardly from the inner surface toward the hollow interior. For example, the rib or ribs can be axially, coaxially circumferentially, helically, and/or longitudinally arranged along the inner surface, and, in those embodiments including a plurality of ribs, preferably wherein the axially, coaxially, circumferentially, helically, and/or longitudinally arranged ribs are equally spaced from one another.

Figure 4:
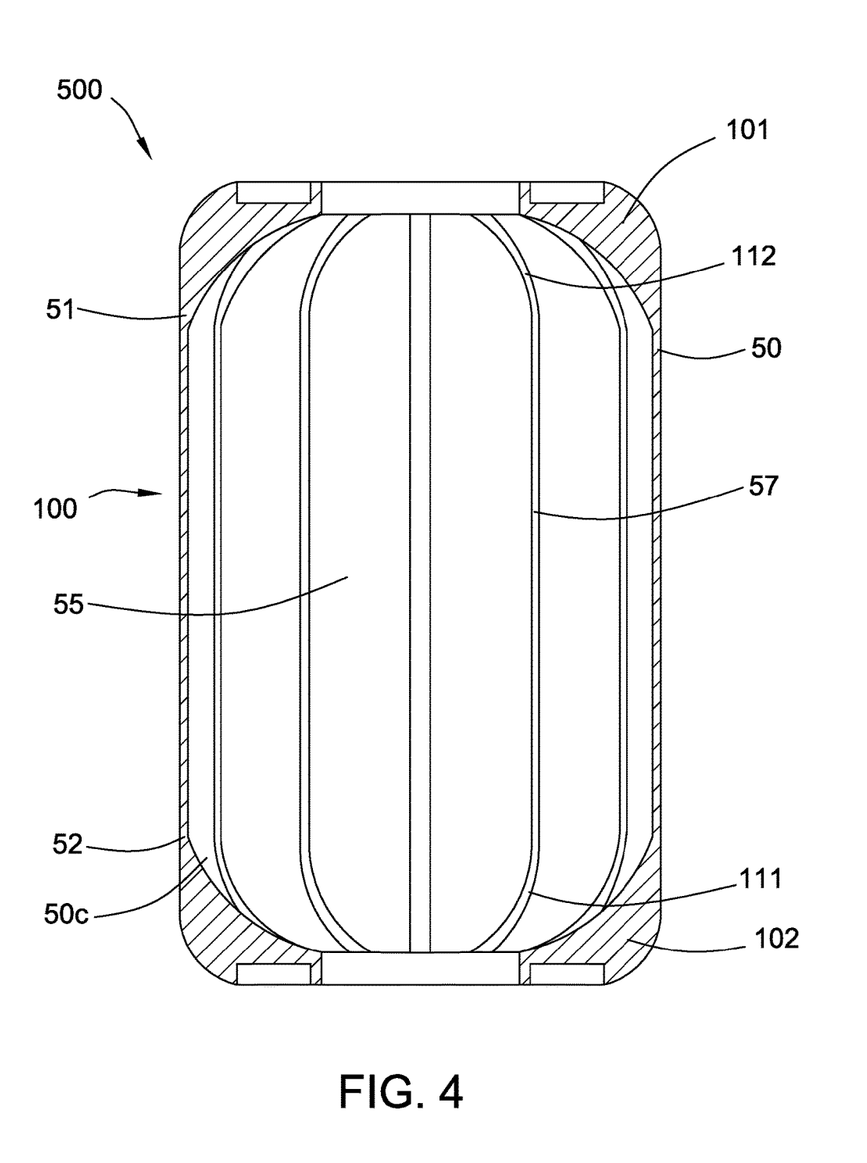
FIG. 4 shows longitudinally arranged porous ribs.

Illustratively, FIG. 4 shows the inner surface of the porous medium with a plurality pf porous ribs 57 arranged longitudinally from one end of the porous medium to the other end. In this illustrated embodiment, porous medium ribs 57 are continuous with end caps porous ribs 111, 112, but the porous medium porous ribs can be present in filters lacking end cap porous ribs, the porous medium porous ribs may not connect to end caps porous ribs, or the filter can have a combination of arrangements, e.g., wherein there are some porous medium porous ribs connecting to end caps porous ribs, and some porous medium porous ribs do not connect to end caps porous ribs.

Figure 5:
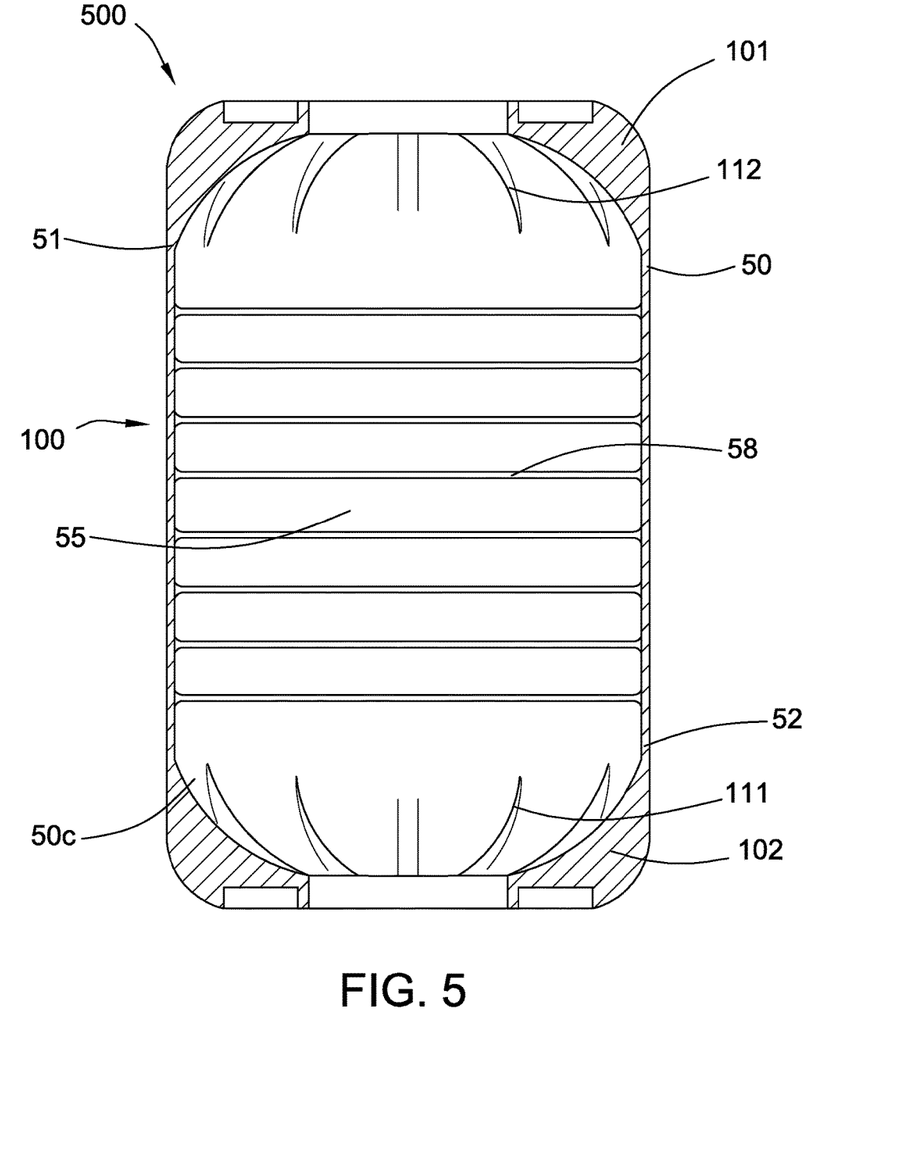
FIG. 5 shows circumferentially and coaxially arranged porous ribs.

In another illustrative embodiment, as shown in FIG. 5, the inner surface of the porous medium has a plurality of porous ribs 58, each porous rib arranged circumferentially on the inner surface, wherein the plurality of porous ribs are shown arranged coaxially (along the axis from opening 151c to opening 152c) from one end of the porous medium to the other end.

Figure 6:
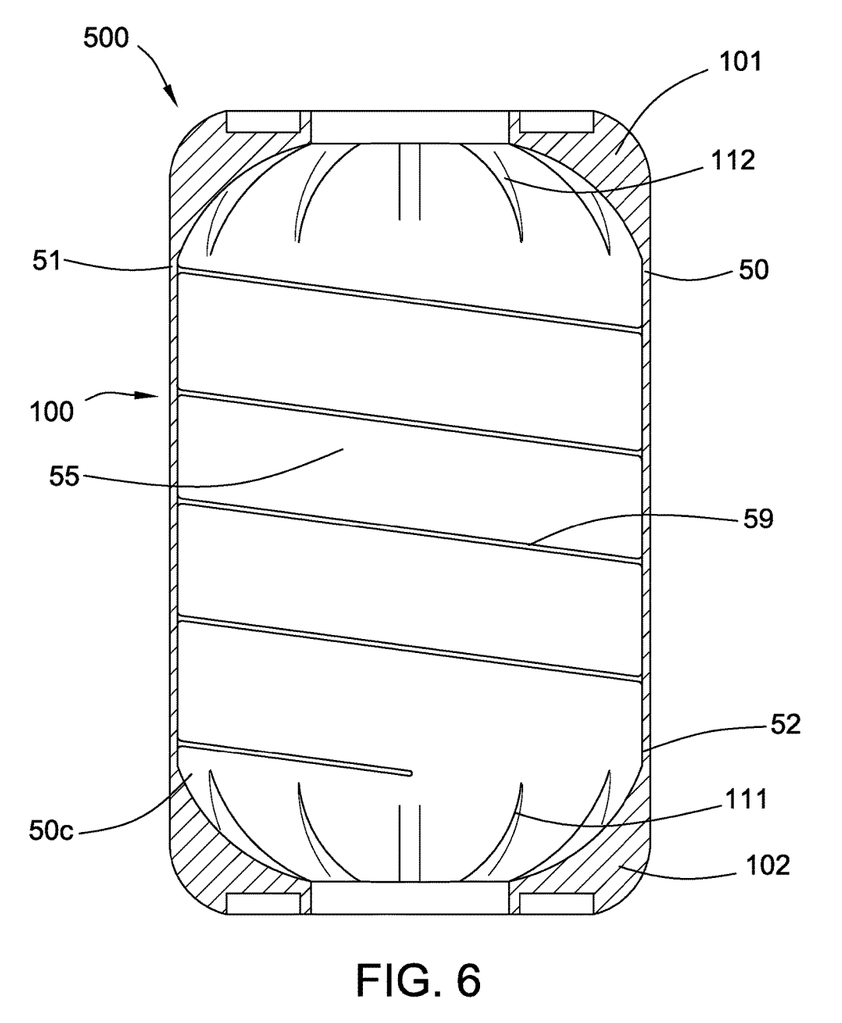
FIG. 6 shows a helically arranged porous rib.

In another illustrative embodiment, as shown in FIG. 6, the inner surface of the porous medium has a porous rib 59, arranged helically.

Figure 7:
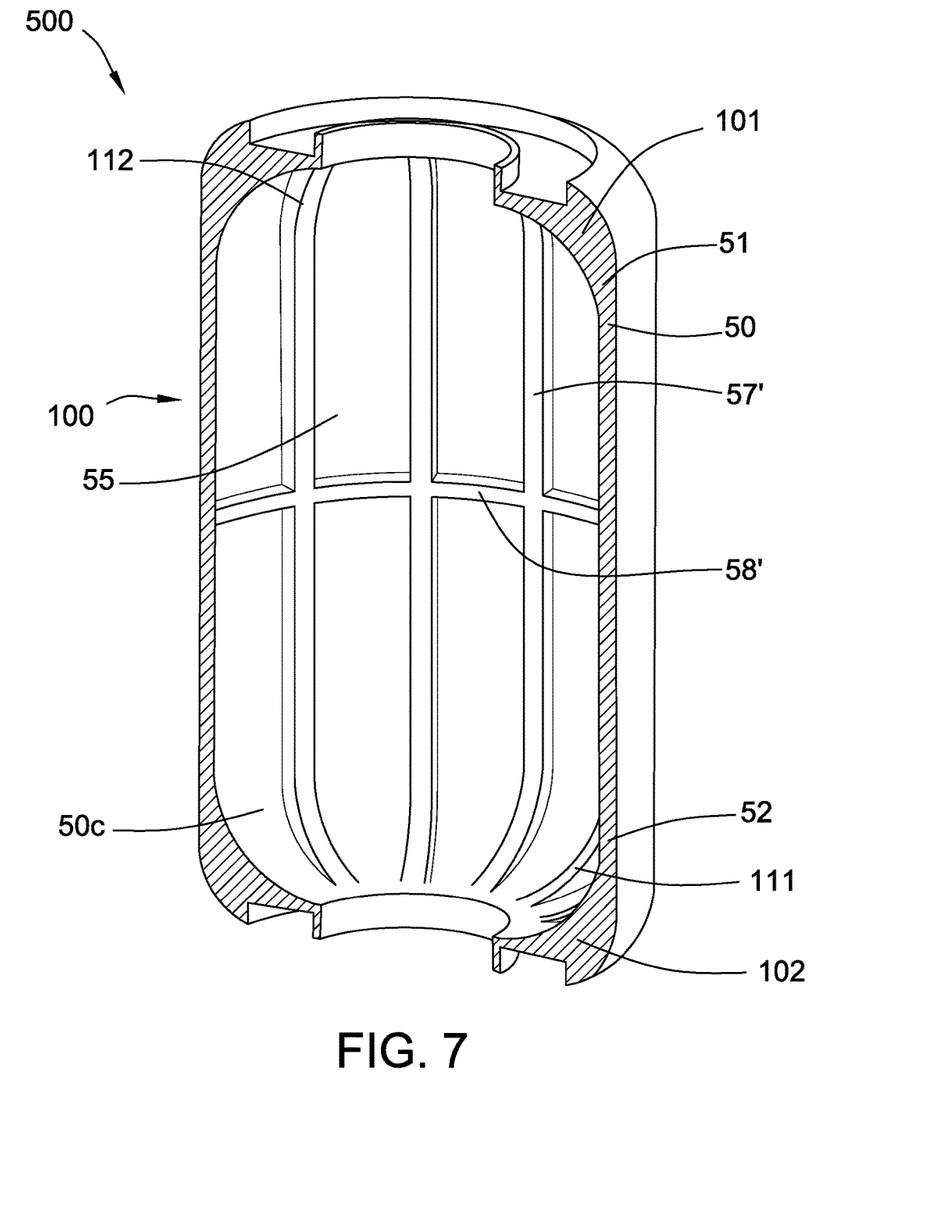
FIG. 7 shows a circumferentially arranged porous rib and longitudinally arranged porous ribs.

In another illustrative embodiment, as shown in FIG. 7, the inner surface of the porous medium has a porous rib 58', arranged circumferentially (and axially along the axis from opening 151c to opening 152c), and well as a plurality of porous ribs 57', arranged longitudinally from one end of the porous medium to the other end, wherein porous ribs 58' and 57' contact each other.

In a variation of the embodiments illustrated in FIGS. 5 and 7, the inner surface of the porous medium can have a single porous rib, arranged circumferentially (and axially along the axis from opening 151c to opening 152c).

The porous medium can include any number of porous ribs, in those embodiments including a plurality of ribs, typically, at least 3 ribs. The ribs can be of any suitable height (extending inwardly from the inner surface of the porous medium), length, and width. While the ribs can be substantially identical to one another, combinations of different ribs can be used, e.g., longer ribs can be alternated with shorter ribs and/or wider ribs can be alternated with narrower ribs.

In some embodiments, the ribs comprise reinforcement ribs. Advantageously, the use of reinforcing ribs on the inner surface of the end caps can resist bending force due to compression during gasket compression and filtration. Alternatively, or additionally, the use of reinforcing ribs on the inner surface of the porous medium can provide for an increased collapse rating (increased hoop strength) during filtration and/or for an increased buckling strength. Advantageously, the use of reinforcing ribs allows filters and filter devices to be produced having such resistance and/or strength without increasing the thickness of the filter element and/or end caps.

Typically, when sealing the filter in a housing, gaskets are placed on the outer surfaces of the end caps, and the gaskets are compressed to seal the filters into the housing. Accordingly, in the embodiment particularly illustrated in FIGS. 2A and 3, the outer surfaces 151a; 152a each include shoulders 171a, 181a; lips 172b; 182b, and groove 191a; 192a, wherein a gasket is placed in the groove, filling or substantially filling the groove.

Filters and filter elements according to embodiments of the invention are monolithic, preferably formed by repeated depositions of a metal powder bound together with an activatable binder (e.g., binder jetting, sometimes referred to as "drop on powder"), typically followed by agglomerating the powder, e.g., by sintering.

Filters according to embodiments of the invention are integral (unitary). Thus, for example, in embodiments comprising a filter element with end caps, the element and endcaps are not separately formed and subsequently combined, e.g., they are neither threaded nor welded together, rather, the filter element and the endcaps are formed together. The filter elements and filters according to embodiments of the invention are also seamless. Seamless filter elements and filters are free of welds.

The porous filter elements, porous end caps, and porous ribs can have any suitable pore structure, e.g., a pore size (for example, as evidenced by bubble point, or by KL as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the composition of the fluid to be treated, and the desired effluent level of the treated fluid.

Typically, in accordance with some embodiments of the invention, the porous element, end caps, and ribs, each have a pore size in the range of from about 2 micrometers (μm) to about 200 micrometers, preferably in the range of from about 10 micrometers to about 50 micrometers.

Typically, in accordance with some embodiments of the invention, the porous element, end caps, and ribs, each have a voids volume of at least about 30%, e.g., in the range of about 40% to about 70%, preferably, in the range of from about 45% to about 55%. Preferably, the voids volume is substantially uniform, varying by no more than ±5% throughout the filter element and end caps and ribs.

The particles used to produce the filters and filter elements can comprise a variety of metal powders, and filters and filter elements can be, for or example, formed from stainless steel powder, such as 316 low-carbon stainless steel, by a process including sintering. Other suitable metal powders include, for example, alloys, nickel, chromium, tungsten, copper, bronze, aluminum, platinum, iron, magnesium, cobalt, or a combination (including a combination of metals and metal alloys) thereof.

The particles can be any suitable size, and filters and filter elements can include a distribution of particle sizes. The size(s) of the particles for a particular application is related to the desired pore size in the finished filter and filter element.

The hollow filter element can have any suitable inner and outer diameter and length.

Preferably, the filter is sterilizable, illustratively, able to be cleaned in place (CIP) via, for example, steam sterilization or chemical sterilization.

In accordance with an embodiment of the invention, a filter device comprises a housing comprising an inlet and an outlet and defining a fluid flow path between the inlet and the outlet, wherein the filter is across the fluid flow path.

Figure 8:
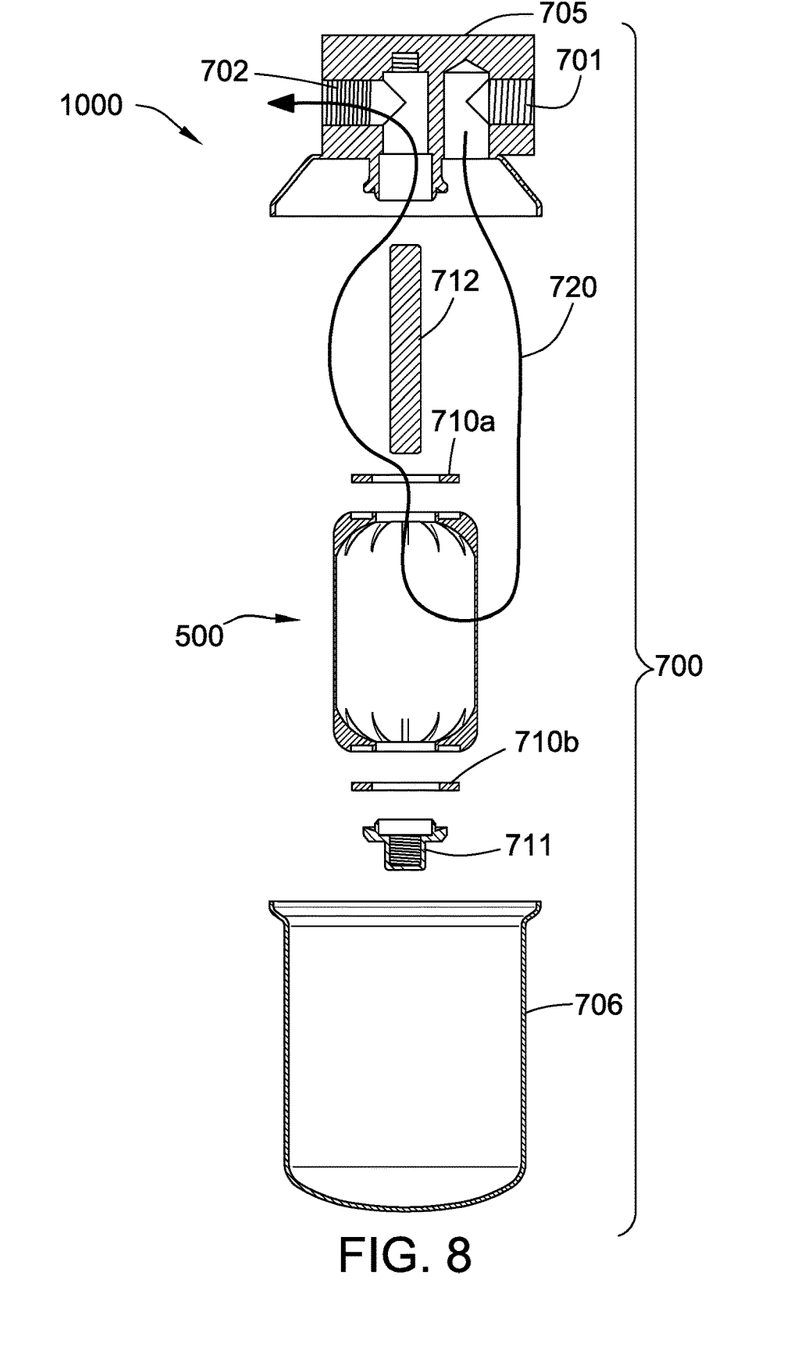
FIG. 8 is an exploded view of a filter device according to an embodiment of the invention, comprising the embodiment of the filter shown in FIG. 1, and a filter housing.

In the embodiment illustrated in FIG. 8, a filter device 1000 comprises a housing 700 comprising an inlet 701 and an outlet 702 and defining a fluid flow path 720 between the inlet and the outlet, wherein the filter 500 is across the fluid flow path. In this illustrated embodiment, the housing 700 comprises a head 705 comprising the inlet and the outlet, and a bowl 706. Typically, when installing the filter in the housing, gaskets 710a, 710b are placed on the outer surfaces of the endcaps, and a threaded seal nut 711 is tightened on a threaded tie rod 712 to seal the filter in the housing.

In preferred embodiments, the filters and filter elements are manufactured via additive manufacturing (sometimes referred to as "additive layer manufacturing" or "3D printing"). The end caps and filter elements can be manufactured together via additive manufacturing in a continuous operation at substantially the same time.

Any suitable additive manufacturing equipment can be used, for example, binder jetting systems for use with metal powders, and a variety of production 3D printers are suitable and commercially available.

The following examples further illustrate the invention but, of course, should not be construed as in any way limiting its scope.

EXAMPLE

This example demonstrates that filters according to an embodiment of the invention effectively filter liquid.

Figure 1:
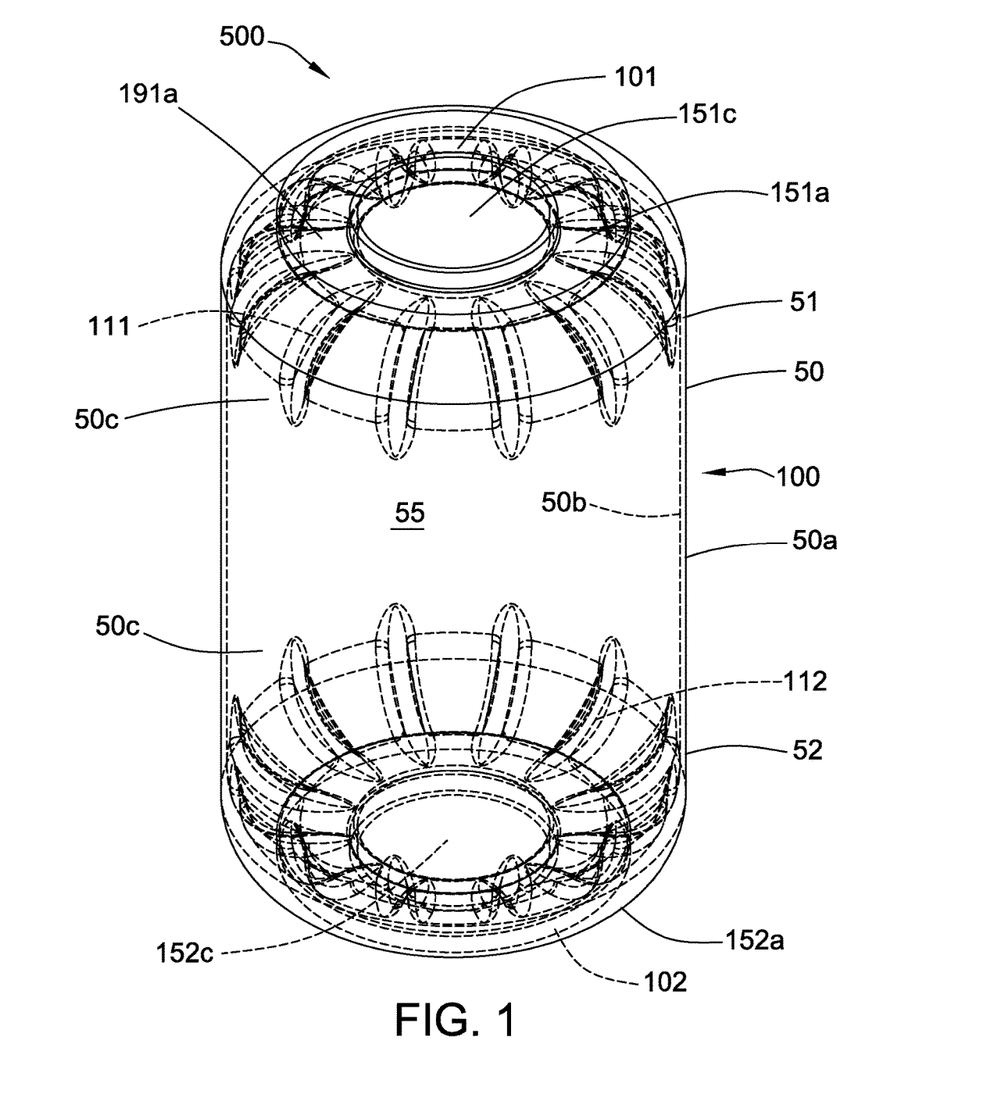
FIG. 1 is a top perspective view of a filter according to an embodiment of the present invention, also showing an end cap.

Filters as generally illustrated in FIG. 1 are produced via binder jetting additive manufacturing utilizing 30 μm diameter 316 low-carbon stainless steel metal powder, followed by sintering by solid state diffusion. The end caps and filter elements are manufactured together such that the end caps are formed with filter elements, and the end caps are formed at the respective ends of the filter elements. The filters are monolithic. The filter elements are about 10 inches in length, having an inner diameter of about 2⅜ inches and the elements, end caps and ribs, each have a pore diameter of about 20 μm.

The density of the stainless steel powder is 8 gm/cc, and based on a measurement of the weight and volume of the filter, the calculated density is 4.4 gm/cc, so the filters each have a voids volume of about $((8.0-4.4)/8.0))=45\%$.

The filters are placed in housings arranged as shown in FIG. 8. Water is passed through the filters using outside-in flow. The water passes through the porous metal medium as well as the porous metal end caps and porous ribs.

The results are:

Isopropyl alcohol (IPA) open bubble point test (1500 cc/0.05 ft$^2$), values range from 19-23.

Air pressure drop (psi/acfm/ft$^2$), values range from 0.012 to 0.014.

Beta1000 (99.9% efficiency) modified OSU-F2 test values range from 9.5 to 10.5 micrometers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter comprising:
(a) a porous filter element comprising a cylindrical porous metal medium having a hollow interior, a first end, and a second end, the porous metal medium having an inner surface defining the hollow interior of the porous metal medium;
(b) a first porous metal end cap formed at the first end of the porous metal medium, the first porous metal end cap having an inner surface facing the first end of the porous metal medium;
(c) a second porous metal end cap formed at the second end of the porous metal medium, the second porous metal end cap having an inner surface facing the second end of the porous metal medium;
wherein the inner surface of the first porous metal end cap and/or the inner surface of the second porous metal end cap includes a plurality of porous ribs extending from the inner surface toward the hollow interior;
and/or
the inner surface of the porous metal medium includes at least one porous rib extending from the inner surface toward the hollow interior.

2. The filter of claim 1, wherein the porous ribs on the inner surface of the first porous metal end cap and/or on the inner surface of the second porous metal end cap are radially arranged.

3. The filter of claim 1, wherein the at least one porous rib on the inner surface of the porous metal medium is circumferentially or helically arranged along the inner surface of the porous metal medium.

4. The filter of claim 1, wherein the inner surface of the porous metal medium includes a plurality of porous ribs extending from the inner surface toward the hollow interior, and the porous ribs on the inner surface of the porous metal medium are axially, coaxially, circumferentially, helically and/or longitudinally arranged along the inner surface of the porous metal medium.

5. The filter of claim 1, wherein the porous ribs on the inner surface of the first porous metal end cap and/or the second porous metal end cap extend from a portion of the inner surface of the first porous metal end cap and/or from a portion of the inner surface of the second porous metal end cap to a portion of the inner surface of the porous metal medium.

6. The filter of claim 1, wherein the first porous metal end cap and/or the second porous metal end cap has a central opening, passing from an outer surface of the porous metal end cap through the inner surface of the porous metal end cap and communicating with the hollow interior of the porous metal medium.

7. The filter of claim 1, having a substantially uniform voids volume throughout the porous metal medium and the first and second end caps.

8. A filter device comprising
(a) a housing comprising an inlet and an outlet and defining a fluid flow path between the inlet and the outlet, wherein the filter is across the fluid flow path; and
(b) a filter comprising:
a porous filter element comprising a cylindrical porous metal medium having a hollow interior, a first end, and a second end, the porous metal medium having an inner surface defining the hollow interior of the porous metal medium;
a first porous metal end cap formed at the first end of the porous metal medium, the first porous metal end cap having an inner surface facing the first end of the porous metal medium;
a second porous metal end cap formed at the second end of the porous metal medium, the second porous metal end cap having an inner surface facing the second end of the porous metal medium;
wherein the inner surface of the first porous metal end cap and/or the inner surface of the second porous metal end cap includes a plurality of porous ribs extending from the inner surface toward the hollow interior;
and/or
the inner surface of the porous metal medium includes at least one porous rib extending from the inner surface toward the hollow interior, disposed in the housing across the fluid flow path.

9. A method of filtering a fluid comprising passing the fluid through a filter comprising:
(a) a porous filter element comprising a cylindrical porous metal medium having a hollow interior, a first end, and a second end, the porous metal medium having an inner surface defining the hollow interior of the porous metal medium;

(b) a first porous metal end cap formed at the first end of the porous metal medium, the first porous metal end cap having an inner surface facing the first end of the porous metal medium;

(c) a second porous metal end cap formed at the second end of the porous metal medium, the second porous metal end cap having an inner surface facing the second end of the porous metal medium;

wherein the inner surface of the first porous metal end cap and/or the inner surface of the second porous metal end cap includes a plurality of porous ribs extending from the inner surface toward the hollow interior;

and/or the inner surface of the porous metal medium includes at least one porous rib extending from the inner surface toward the hollow interior.

10. The method of claim 9, wherein the fluid comprises steam.

11. The filter of claim 2, wherein the at least one porous rib on the inner surface of the porous metal medium is circumferentially or helically arranged along the inner surface of the porous metal medium.

12. The filter of claim 2, wherein the inner surface of the porous metal medium includes a plurality of porous ribs extending from the inner surface toward the hollow interior, and the porous ribs on the inner surface of the porous metal medium are axially, coaxially, circumferentially, helically and/or longitudinally arranged along the inner surface of the porous metal medium.

13. The filter of claim 2, wherein the porous ribs on the inner surface of the first porous metal end cap and/or the second porous metal end cap extend from a portion of the inner surface of the first porous metal end cap and/or from a portion of the inner surface of the second porous metal end cap to a portion of the inner surface of the porous metal medium.

14. The filter of claim 2, wherein the first porous metal end cap and/or the second porous metal end cap has a central opening, passing from an outer surface of the porous metal end cap through the inner surface of the porous metal end cap and communicating with the hollow interior of the porous metal medium.

15. The filter of claim 2, having a substantially uniform voids volume throughout the porous metal medium and the first and second end caps.

16. The filter of claim 11, wherein the inner surface of the porous metal medium includes a plurality of porous ribs extending from the inner surface toward the hollow interior, and the porous ribs on the inner surface of the porous metal medium are axially, coaxially, circumferentially, helically and/or longitudinally arranged along the inner surface of the porous metal medium.

17. The filter of claim 16, wherein the porous ribs on the inner surface of the first porous metal end cap and/or the second porous metal end cap extend from a portion of the inner surface of the first porous metal end cap and/or from a portion of the inner surface of the second porous metal end cap to a portion of the inner surface of the porous metal medium.

18. The filter of claim 3, wherein the porous ribs on the inner surface of the first porous metal end cap and/or the second porous metal end cap extend from a portion of the inner surface of the first porous metal end cap and/or from a portion of the inner surface of the second porous metal end cap to a portion of the inner surface of the porous metal medium.

19. The filter of claim 4, wherein the porous ribs on the inner surface of the first porous metal end cap and/or the second porous metal end cap extend from a portion of the inner surface of the first porous metal end cap and/or from a portion of the inner surface of the second porous metal end cap to a portion of the inner surface of the porous metal medium.

20. A method of filtering a fluid comprising passing the fluid through a filter comprising:

(a) a porous filter element comprising a cylindrical porous metal medium having a hollow interior, a first end, and a second end, the porous metal medium having an inner surface defining the hollow interior of the porous metal medium;

(b) a first porous metal end cap formed at the first end of the porous metal medium, the first porous metal end cap having an inner surface facing the first end of the porous metal medium;

(c) a second porous metal end cap formed at the second end of the porous metal medium, the second porous metal end cap having an inner surface facing the second end of the porous metal medium;

wherein the inner surface of the first porous metal end cap and/or the inner surface of the second porous metal end cap includes a plurality of porous ribs extending from the inner surface toward the hollow interior;

and/or the inner surface of the porous metal medium includes at least one porous rib extending from the inner surface toward the hollow interior, wherein the porous ribs on the inner surface of the first porous metal end cap and/or on the inner surface of the second porous metal end cap are radially arranged.

* * * * *